July 12, 1927.
N. W. AMDUR
UNIVERSAL JOINT
Filed Nov. 18, 1924
1,635,164
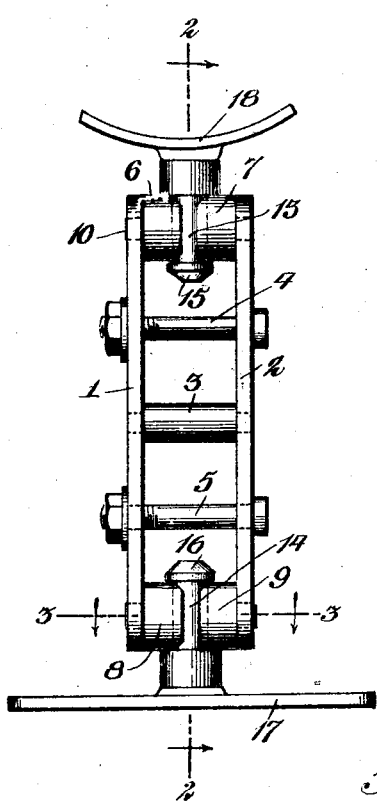
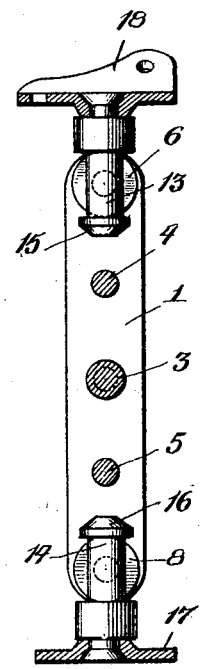
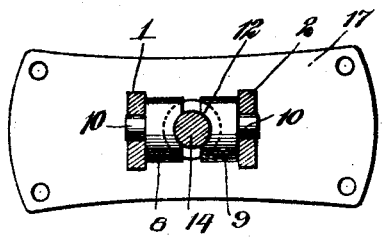
WITNESSES
INVENTOR
Noah W. Amdur
BY
ATTORNEYS Patented July 12, 1927.

1,635,164

UNITED STATES PATENT OFFICE.

NOAH W. AMDUR, OF NEW ROCHELLE, NEW YORK, ASSIGNOR TO SUN-RAY LIGHTING PRODUCTS, INC., OF NEW YORK, N. Y., A CORPORATION OF NEW YORK.

UNIVERSAL JOINT.

Application filed November 18, 1924. Serial No. 750,688.

This invention relates to a universal joint.

An object of the invention is to provide a simple, compact, durable and efficient construction to act as a universal joint which will enable the utmost relative flexibility between the elements of the joint and a wide range of variation in the position which the parts can assume as the joint elements are manipulated.

The invention is illustrated in the drawings, of which—

Figure 1 is an elevation of the joint;

Fig. 2 is a section taken on the line 2—2 of Fig. 1; and

Fig. 3 is a section taken on the line 3—3 of Fig. 1.

The form of the invention shown in the drawings is a preferred form, although it is understood that modifications in the construction and arrangement of the parts and in the character of the materials used may be adopted without departing from the spirit of the invention as set forth in the appended claims.

In its general aspect this invention comprises a frame adjacent the opposite ends of which pairs of segmental bearing blocks are mounted for pivotal movement around an axis at an angle, preferably a right angle, to the longitudinal axis of the frame. In each of these pairs of segmental bearing blocks a journal or shaft is mounted for rotation in the blocks around an axis parallel to the longitudinal axis of the frame. Consequently, any element, such as a bracket, which may be connected to these journals or shafts, can be rotated with the shaft a full 360° around an axis parallel to the longitudinal axis of the frame, and at the same time the journals and the bearing blocks can be rotated almost 360° around an axis at right angles to the longitudinal axis of the frame. This construction, therefore, is simple and durable and will give a wide range of relative adjustment between an element connected to one journal with respect to an element connected to the other journal at the opposite end of the frame.

In the preferred form of the invention as shown in the drawings, I provide a frame formed of two plates 1 and 2, preferably spaced by means of a spacing sleeve 3 and headed bolts 4 and 5. At each end of the frame, and disposed between the plates 1 and 2, I rotatably mount a pair of segmental bearing blocks 6, 7, 8 and 9. These blocks are pivoted in the ends of the plates by means of stub shafts such as 10. The adjacent faces of these blocks are provided with grooves such as 11 and 12 to act as bearing surfaces for the journals such as 13 and 14 in the form of shafts, the inner ends of these journals being enlarged in the form of heads 15 and 16 to prevent the shafts from slipping out of the bearing. The outer ends of the journals are preferably adapted to receive any suitable element, such as a wall plate 17, on the end of one journal and a bracket plate 18 on the outer end of the other journal. By adjusting the distance between the plates 1 and 2, the degree to which the bearing blocks embrace the journals 13 and 14 can be regulated as desired.

It will be obvious from this construction that each of the journal elements can be rotated 360° around an axis parallel to the longitudinal axis of the frame and can be swung almost 360° around an axis at right angles to the longitudinal axis of the frame, by reason of the fact that the bearing blocks are rotatably mounted in the frame.

What I claim is:—

1. A universal joint, which comprises a frame, a pair of segmental bearing blocks rotatably mounted within the frame adjacent one end thereof for rotation around an axis at right angles to the longitudinal axis of the frame, and a journal embraced by said blocks, said journal element adapted for rotation around an axis at right angles to the axis of the blocks.

2. A universal joint, which comprises a pair of spaced plates, means for adjusting the distance between the plates, a pair of segmental bearing blocks disposed between the plates at each end thereof for rotation around an axis at right angles to the longitudinal axis of the plates, and a journal embraced by each pair of bearing blocks and adapted for rotation around an axis at right angles to the axis of the blocks.

3. A universal joint construction, which comprises a pair of plates, spacing elements disposed between the plates, means extending between the plates for adjusting the distance therebetween, a pair of segmental bearing blocks disposed at each end of the plates and therebetween, said blocks being mounted for rotation around an axis at right angles to the longitudinal axis of the plates, and a journal embraced between each pair of blocks for rotation around an axis at right angles to the axis of the blocks.

NOAH W. AMDUR.